United States Patent [19]
Kitson et al.

[11] Patent Number: 4,754,393
[45] Date of Patent: Jun. 28, 1988

[54] SINGLE-CHIP PROGRAMMABLE CONTROLLER

[75] Inventors: Bradford S. Kitson, Cupertino; Warren K. Miller, Palo Alto, both of Calif.

[73] Assignee: Advanced Micro Devices, Inc., Sunnyvale, Calif.

[21] Appl. No.: 684,521

[22] Filed: Dec. 21, 1984

[51] Int. Cl.⁴ ............................................. G06F 09/22
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,003,033 | 1/1977 | O'Keefe et al. | 364/200 |
| 4,307,445 | 12/1981 | Tredennick et al. | 364/200 |
| 4,330,823 | 5/1982 | Retter | 364/200 |
| 4,347,566 | 8/1982 | Koda et al. | 364/200 |
| 4,415,969 | 11/1983 | Bayliss et al. | 364/200 |
| 4,434,465 | 2/1984 | McDonough et al. | 364/200 |
| 4,467,444 | 8/1984 | Harmon, Jr. et al. | 364/900 |

OTHER PUBLICATIONS

Microprogramming: A Tutorial and Survey of Recent Developments, IEEE, 1980, 18 pages.

Primary Examiner—Gary V. Harkcom
Assistant Examiner—C. H. Lynt
Attorney, Agent, or Firm—Patrick T. King; Kenneth B. Salomon; J. Vincent Tortolano

[57] ABSTRACT

A single-chip microprogrammable sequence controller includes a subroutine stack and conditional branching facilities. The controller performs a test and mask operation followed by comparison with a user-defined constant to effect a Boolean sum-of-product function. Address control logic includes a flag signal set by compare logic; the flag is available to a microinstruction decoder where it can be used during a subsequent conditional branch operation based on the setting of the flag.

10 Claims, 6 Drawing Sheets

CONNECTION DIAGRAM

FIG. 5

SINGLE-CHIP PROGRAMMABLE CONTROLLER

BACKGROUND OF THE INVENTION

1. Field of the Invention

This invention relates to digital electronic state-machines and, in particular, to single-chip fuse programmable state-machines.

2. Description of the Prior Art

A state machine is a digital device which provides predetermined output logic states in response to certain input states. State machines have been designed using discrete digital logic gates and flip-flops. A design technique called microprogramming allows the logic gates and flip-flops to be replaced by memory elements such as read-only memories (ROMs) and fuse programmable logic arrays (FPLAs).

A microprogrammed control unit is a state machine which, in its simplest form includes only a read-only memory ROM and an address register. The address register supplies parallel addresses to the ROM address input terminals. The ROM stores a sequence of microinstruction code words, each having two fields. The first field is a control field which contains the control bits to be delivered to whatever external system is being controlled. Such an external system is, for example, the arithmetic logic unit ALU of a computer system. The second field of a microinstruction code word contains the next ROM address, that is the address for the next microinstruction code word.

Microprogram controllers, sometimes called address sequencers, have evolved to replace the address register included in the above-described microprogrammed control unit. An address sequencer reduces the ROM memory size by eliminating the need for storage in the ROM of that part of a microinstruction code word which contains the next ROM address. The address register is replaced with an integrated circuit microprogram controller, or address sequencer, such as the Am2910 Microprogram Controller produced by Advanced Micro Devices, Inc., Sunnyvale, Calif., which, for example, controls the execution sequence of the microinstructions stored in another integrated circuit, such as a ROM. In addition to providing sequential access to the appropriate ROM memory locations, the Am2910 can provide conditional branching to any one of 4096 microinstructions stored in the memory. For each microinstruction, the Am2910 provides a 12-bit address to an external microprogram memory from any one of four different sources: a microprogram address counter-register, an external input, a loop counter, and a stack register.

Microprogram address sequencers such as the Am2910 described above are separately packaged integrated circuits which are combined with a number of other separately packaged memory devices, such as a ROM and a number of support and interface integrated circuits, to form a chip set which functions as a control unit for an arithmetic logic unit (ALU) of a computer system. Obviously, providing a multiple chip set by using a number of discrete integrated circuits results in a large number of integrated circuit pins which must be interconnected with printed circuit boards and the like with attendant production and utilization costs. These costs include the cost of the circuit board and design costs such as layout power for each integrated circuit, consumption of space within a system, handling, and the like. Clearly, elimination of a number of separate integrated circuit packages and integration of a state machine or microprocessor control unit on a single integrated circuit has many production and utilization benefits.

SUMMARY OF THE INVENTION

An object of the invention is to provide an integrated microprogrammable controller on a single-chip.

Another object of the invention is to provide a single-chip integrated circuit device which functions as a digital logic state machine.

A further object of the invention is to provide a microprogrammed controller on a single-chip which eliminates the need for external interconnections between a number of discrete integrated circuits which are combined to complement a digital logic state machine design.

In accordance with these and other objects of the invention, a single-chip integrated circuit is provided which functions as a programmable controller having on the single-chip a microprogrammable memory for storage of microinstruction words, microaddress control logic, and microinstruction decoder means. A microinstruction word stored in the memory has two parts. The first part includes an internal microinstruction field contained internally within the single-chip integrated circuit. The second part includes an external output field for the controller.

The external field is user-defined to be used as required, for example, to provide a sequence of control codes. The internally contained microinstruction field includes an internal opcode subfield as well as an internal immediate data/masking subfield.

The internal opcode subfield is coupled to the microinstruction decoder means functions to decode the opcode subfield to provide appropriate control outputs which are internally coupled on the chip to the microaddress control logic for controlling operation thereof.

The microaddress control logic includes a control logic multiplexer which has its output coupled to the address input of the microprogram memory. One of the control logic multiplexer inputs is from an external data input terminal of the chip. Another of the control logic multiplexer inputs is the internally routed immediate data/masking subfield of the microinstructions field.

In one aspect of the invention, the memory is fuse-programmable; and in another aspect the memory includes a pipeline register coupled to the output of the memory. Further, at least one bit of the general purpose output field of the chip is enabled with an output-enable bit of the internal microinstruction field.

The controller contains GOTO logic for logically coupling external data inputs to the control logic multiplexer. The GOTO logic includes means for selecting the internal immediate-data/masking subfield and the external data to be provided at its output. Bitwise masking of the external data input is accomplished using the internal immediate data/masking subfield. Additionally, the GOTO logic includes comparison logic means which provides and equal-to output when the masked version of the external data field is equal to an internally provided constant subfield supplied by the microprogram memory.

Condition code selection logic is provided which shares a common input to the integrated circuit chip with the external test data input to the GOTO logic.

The dual usage of one input permits the input pin count to be reduced. The condition code logic is controlled by an internal test condition select subfield of a microinstruction word to provide a select one of the inputs from the external test data inputs, a condition code input, and an equal-to input from the GOTO logic.

The controller according to the invention includes a reconfigureable loop counter/subroutine register arrangement which can be set up to provide a separate subroutine register, a separate counter, a two-deep stack register, and a two-deep nested counter.

The control logic multiplexer, feeding the microprogram memory, has both a program counter input and incremented program counter input.

The fact that a number of the various fields and subfields are internally coupled on the single integrated chip provides for maximum functionality with a minimized number of integrated-circuit output pins.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate the invention and, together with the decription, serve to explain the principles of the invention. In the drawings.

DETAILED DESCRIPTION OF THE PREFERRED EMBODIMENT

Reference is now made in detail to the present preferred embodiment of the invention which illustrates the best mode presently contemplated by the inventors of practicing the invention, a preferred embodiment of which is illustrated in the accompanying drawings.

Figure 1:
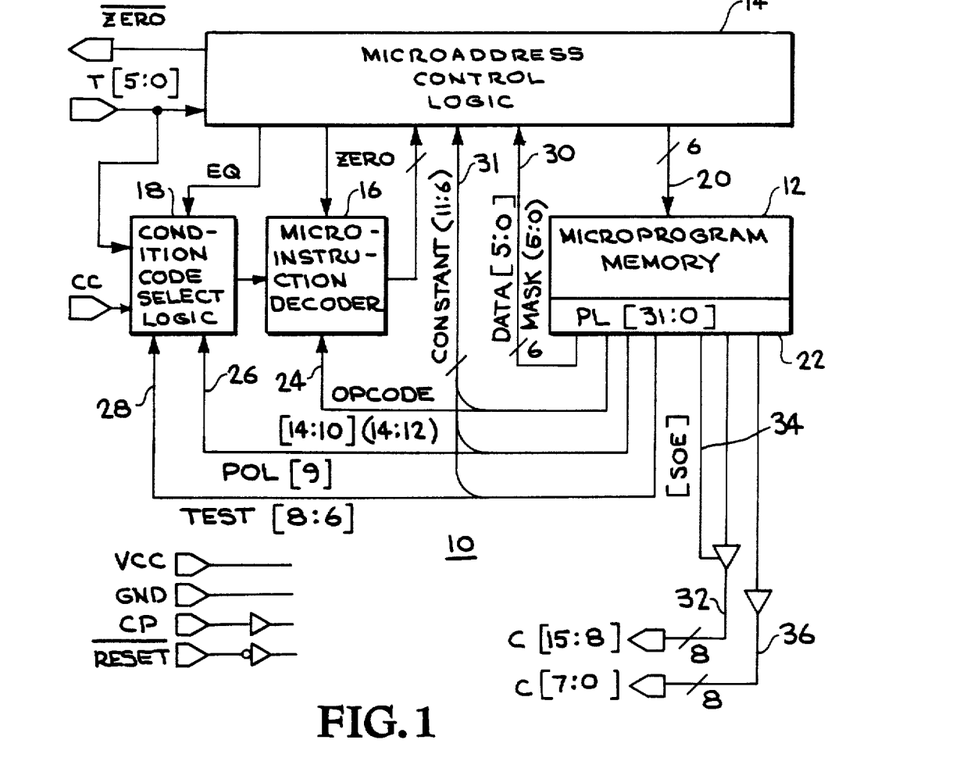
FIG. 1 is a block diagram of a single-chip fuse programmable controller according to the invention.

FIG. 1 shows a particular version of a preferred embodiment of programmable controller 10. The controller 10 is a single-chip integrated circuit and includes four elements: a microprogram memory 12, a microaddress control logic 14, a microinstruction decode circuit 16, and a condition code selection logic 18. In this preferred embodiment of the invention, the microprogram memory 12 is a fuse programmable memory containing user defined instructions. However, it should be appreciated that the memory 12 may include memories such as RAMs read only memories ROMs, electrically programmable ROMs EPROMS, and electricly erasable EPROMs EEP Proms, and the like. The microaddress control logic 14 provides address inputs on a six bit address bus 20 to the microprogram memory 12. As described hereinbelow, the microaddress control logic 14 provides the controller 10 with functions such as conditional branching, subroutine calling and returning, looping, and multiway branching. The condition code selection logic 18 selects the appropriate test condition code and its polarity when a conditional microinstruction is to be executed. The microinstruction decode logic 16 provides appropriate control signals for elements of the control logic 14.

MICROPROGRAM MEMORY

The microprogram memory 12 is configured as a fuse programmable read only memory (PROM) which contains sixty-four microwords, each being 32 bits wide. The microprogram memory 12 includes a pipeline register 22 at its output. The pipeline register 22 contains the microword currently being executed, as designated by PL[31:0]. The microword format is shown below:

| PL31 | PL30-PL16 | PL15-PL0 |
|------|-----------|----------|
| [SOE] | [MICROINSTRUCTION] | [USER DEFINED GENERAL PURPOSE CONTROL OUTPUTS] |

Figure 2:
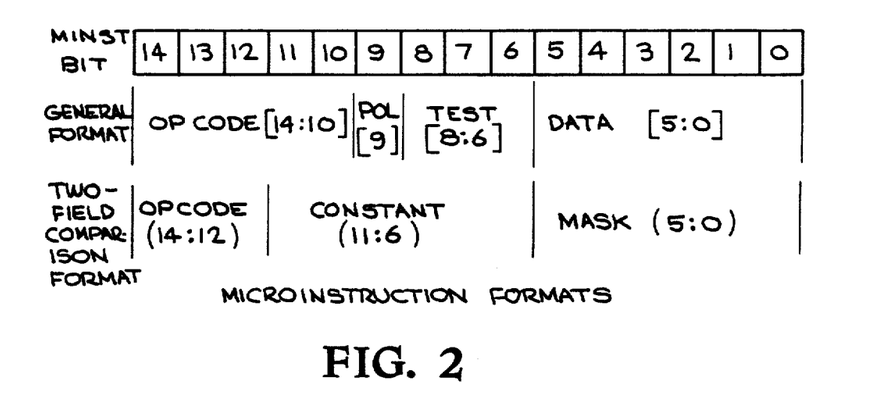
FIG. 2 is a diagram showing two microinstruction formats for the controller of FIG. 1.

FIG. 2 shows the general format for microinstructions.

A one bit synchronous output enable control bit [SOE] is in bit position PL[31]. The next 15 bits of a microword in the pipeline register, PL[30:16] remain internal to the controller 10, designated as MINST[14:0] in FIG. 2, to control address sequencing.

| WHERE: | |
|---|---|
| OPCODE [14:10] = | A five-bit opcode subfield for selecting one of twenty-eight single data field microinstructions. |
| POL [9] = | A one-bit test condition polarity select subfield. |
| TEST [8:6] = | A three-bit test condition select subfield. 0 = Test for true (HIGH) condition. 1 = Test for false (LOW) condition. |

| TEST [8:6] | BIT UNDER TEST |
|---|---|
| 000 | T[0] |
| 001 | T[1] |
| 010 | T[2] |
| 011 | T[3] |
| 100 | T[4] |
| 101 | T[5] |
| 110 | CC |
| 111 | EQ |

| DATA [5:0] = OR MASK(5:0) | A six-bit conditional branch microaddress, test input or counter value subfield (designated as PL in microinstruction mnemonics). |
|---|---|

Referring back to FIG. 1, the general format microinstruction field five-bit opcode subfield OPCODE[14:10] in MINST[14:10] is internally coupled to the microinstruction decoder 16 on a bus 24. A one-bit test polarity select subfield POL [9] in MINST[9] is internally coupled to the condition code select logic 18 on a bus 26. A three-bit test condition select subfield TEST[8:6] in MINST[8:6] is internally coupled to the condition code select logic 18 on a bus 28. A six-bit immediate data subfield DATA[5:0] or MASK[5:0] in MINST[5:0] is internally coupled to the microaddress control logic on a bus 30. As described hereinbelow, MINST[5:0] is used for branch addresses, test input masks and counter values. The advantages of internally coupling the MINST[14:0] field within the integrated circuit are numerous as compared to having separate integrated circuit packages linked by package pins and printed circuit wiring and the like.

Still referring to FIG. 1 of the drawings, the lower 16 bits PL[15:0] of a microword are provided on the integrated circuit output pins as user-defined general purpose external control outputs C[15:0]. The upper eight external control outputs C[15:8] are provided on an eight-bit tristate bus 32 which is enabled by [SOE] on line 34. The lower eight external control outputs C[7:0] are provided on an output bus 36.

The controller 10 provides 29 microinstructions. Various state machine configurations are created with the 29 microinstructions of this particular embodiment. The microinstruction set is orthogonal and has been optimized for parallel, multipath operations as well as for efficient utilization of microprogram memory. Twenty-eight of the microinstructions follow the general format described immediately above, using a single data field.

As shown in FIG. 2, a special two-field comparison microinstruction format contains two data fields.

WHERE:
OPCODE(14:12) = Compare microinstruction (binary 100).
CONSTANT(11:6) = A six-bit constant subfield for comparison.
MASK(5:0) = A six-bit mask subfield for masking external data inputs.

Referring to FIG. 1, the microinstruction subfields for the two-field comparison format includes an opcode subfield OPCODE (14:12) coupled on three lines of the bus 24 to the microinstrction decoder 16, a constant subfield CONSTANT (11:6) coupled on a bus 31 to an input of the microaddress control logic 14, and mask subfield MASK (5:0) coupled on bus 30 to an input of the microaddress control logic 14.

In summary, the pipeline register 22 has a microinstruction word output PL[31:0] which includes a user defined general purpose external control output field PL[15:0], which has some tristate outputs internally controlled by PL[31], SOE, and an internal microinstruction output field PL[31:16]. The microinstruction field MINST [14:0] for the general format microinstruction includes subfields for an opcode, a condition code polarity select, a test condition select, and data. The two-field comparison microinstruction includes subfields for an opcode, a constant, and a mask.

BLOCK DIAGRAM

Figure 3A:
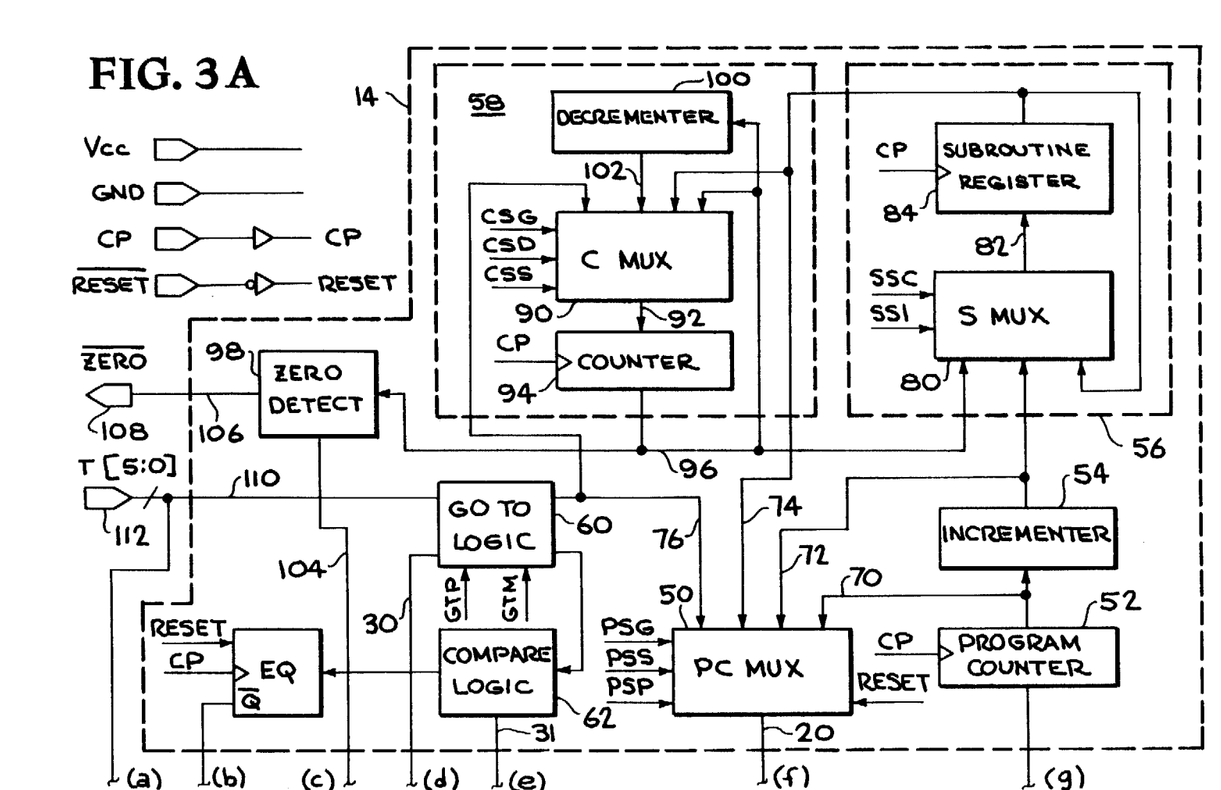
FIGS. 3A and 3B together show a more detailed block diagram of the controller of FIG. 1.
Figure 3B:
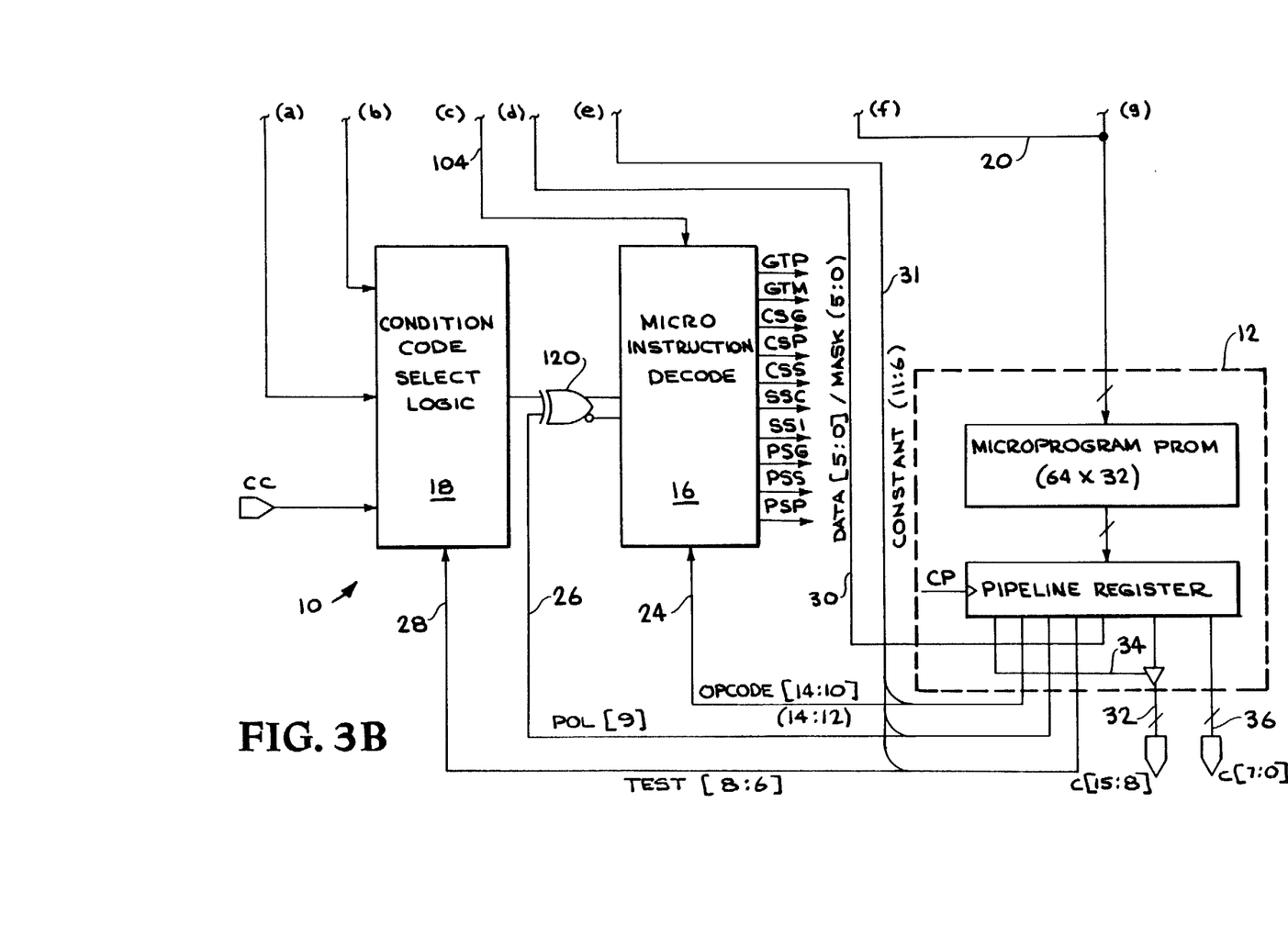

FIGS. 3A and 3B, taken together, shows in more detail the elements of the fuse programmable controller 10. The major elements of the fuse programmable controller 10, as described hereinabove with reference to FIG. 1 and shown by broken lines in FIG. 3, are the microprogram memory 12 described hereinabove, the microaddress control logic 14, the microinstruction decode logic 16, and the condition code selection logic 18. As indicated, clock pulses are indicated by CP and a reset function by RESET, with Vcc and GND, respectively, representing a five-volt supply voltage and ground. Further details of the major elements in addition to the memory 12 are described as follows:

MICROADDRESS CONTROL LOGIC

Referring to FIGS. 3A and 3B, the microaddress control logic 14 includes a program control logic multiplexer (PCMUX) 50, a microprogram address counter 52, a post incrementer 54 for the microprogram address counter 52, a stack register circuit 56, a loop counter circuit 58, and a GOTO logic circuit 60, including a compare logic circuit 62.

PROGRAM CONTROL LOGIC MULTIPLEXER-PC MUX

The program control logic multiplexer 50 (PC MUX) is a six-bit wide, four-to-one multiplexer which has its output coupled on the six-bit address bus 20 to the address input of the microprogram memory 12. The program control logic multiplexer 50 has a plurality of inputs. In this particular embodiment of the invention, there are four inputs provided as follows: a bus 70 is coupled to the output of the microprogram address counter 52, a bus 72 is coupled to the output of the microprogram address post incrementer 54, a bus 74 is coupled to the output of the stack register circuit 56, and a bus 76 is coupled to the output of the GOTO logic 60.

The six-bit address bus 20 from the output of the program control logic multiplexer 50, which is connected to the input of the microprogram address counter 52, permits the microprogram address counter 52 to contain the microaddress of the microinstruction, which is simultaneously being held in the pipeline register 30. Note that during a reset condition, the output of the program control logic multiplexer 50 is set to an all ones condition which selects the uppermost memory location, 63, of the microprogram memory 12 as the next microinstruction location.

MICROPROGRAM ADDRESS COUNTER AND POST INCREMENTER

The microprogram address counter 52 is a six-bit D-type rising-edge triggered register which provides an output on bus 70 to one input of the program control logic multiplexer 50 and to the input of the microprogram address counter post incrementer 54, which is a six-bit combinatorial incrementer circuit. The post incrementer circuit 54 has its output coupled to the bus 72 which feeds another input of the program control logic multiplexer 50 and which also feeds an input of the stack register circuit 56. Since both the output of the microprogram address counter 52 and the output of the address post incrementer circuit 54 are inputs to the program control logic multiplexer 50, both the present value of the microprogram address and an incremented value of the program address from the microprogram address counter 52 are available as possible microaddress inputs to the microprogram memory 12. The output of the post incrementer circuit 54 is available for pushing subroutine return addresses into the stack register circuit 56. The present program address count value provided by the micoprogram address counter 52 is used, for example, to provide timing or waiting functions in which the same microinstruction is repeatedly re-fetched prior to occurrence of a valid condition in order to efficiently use microprogram memory space. Using the output of the post incrementer circuit 54 allows sequential microprogram operation, for example, with unconditional microinstructions and also provides a default address for conditional microinstructions.

STACK REGISTER

The stack register circuit 56 and the loop counter circuit 58 together form a reconfigurable counter/stack arrangement which can be treated as one logic block because of the unique interaction between the counter and the stack elements. Configuration control is accomplished by selection of various multiplexer paths and the GOTO logic 60.

Taken alone, the stack register circuit 56, includes a six-bit wide, three-to-one stack register multiplexer SMUX 80 which has an output bus 82 coupled to the input of a stack, or subroutine, register SREG 84 which is a six-bit D-type rising-edge triggered register. The output of the stack register 84 is coupled by respective branches of the bus 74 to one of the inputs of the program program control logic multiplexer 50 and back to another input of the stack register multiplexer 80. Note that the bus 74 is also coupled to the loop counter circuit 58. Normal operation of the stack register circuit 56 is as a one-deep stack for saving subroutine return addresses using the microprogram counter post incrementer 54 as the source of the address and the program control logic multiplexer 50 as the address destination when returns from subroutines are performed.

LOOP COUNTER

Taken alone, the loop counter circuit 58 includes a loop counter multiplexer CMUX 90 which is a six-bit wide, four-to-one multiplexer having an output bus 92 coupled to the input of a six-bit D-type rising-edge triggered loop counter 94 which has its output provided on respective branches of an output bus 96 to the inputs of four circuits. One of these inputs is a third input to the stack register multiplexer SMUX 80 and another input is an input to a zero detection circuit 98. The loop counter output bus 96 is connected to another input of the loop counter multiplexer CMUX 90 and also to an input of a six-bit wide combinatorial decrementer 100, which has its output coupled on a bus 102 to a third input of the loop counter multiplexer CMUX 92. The loop counter multiplexer CMUX 90 has a fourth input coupled to a branch of the bus 76 connecting the output of the GOTO logic 60 to the input of the program control logic multiplexer 50. The loop counter multiplexer CMUX 90 selects one of four possible inputs for the loop counter 94, that is, the output of the branch control logic 60, the decrementer 100, the stack register circuit 56, and the loop counter 94 itself. The loop counter 94 is typically used for timing functions and for iterative loop counting. Initial count values are provided from the GOTO logic 60 and are decremented by the loop counter 94 until a zero count is achieved at which time the zero detection circuit 98 provides an output signal on a bus 104 which is fed to an input of the microinstruction decode logic circuit 16. When a zero count is detected, a logical LOW is also provided on another output bus 106 of the zero detection circuit connected to an inverted ZERO output terminal pin 108 of the integrated circuit.

STACK REGISTER AND LOOP COUNTER TOGETHER

Taken together, the stack register circuit 56 and the loop counter circuit 58 can interact by having the output of each be an input for the other. The loop counter output bus 96 is coupled to an input of the stack register multiplexer 80, while the output bus 74 of the stack register circuit 56 is coupled to an input of the loop counter multiplexer 90. This arrangement permits the loop counter 94 to serve as an additional stack location for the stack register circuit 56 not being used for counting. This arrangement also permits the stack register circuit 56 to be part of a nested counter when not being used as a stack register. Thus, the stack register circuit 56 and a loop counter circuit 58 operate in three different modes: as a separate one-deep stack and a separate counter, as a two-deep stack, and as a two-deep nested counter.

GOTO LOGIC

The GOTO logic circuit 60 has an input to which is coupled an external-data test bus 110 from the integrated circuit test/data input terminals 112. The GOTO logic 60 has another input provided on the internal-data/mask bus 30. Data on the test/external-data bus 110 is indicated as T[5:0]. Data on the internal-data/mask bus 30 is designated DATA[5:0] or MASK[5:0]. When any type of conditional branch function is being executed, the output of the GOTO logic 60 is coupled on data bus 76 to an input of the program control logic multiplexer 50. When a count value is to be loaded into the loop counter circuit 58, the GOTO logic 60 output is coupled through a branch of the bus 76 to an input of the loop counter multiplexer 90 as previously discussed.

Figure 4A:
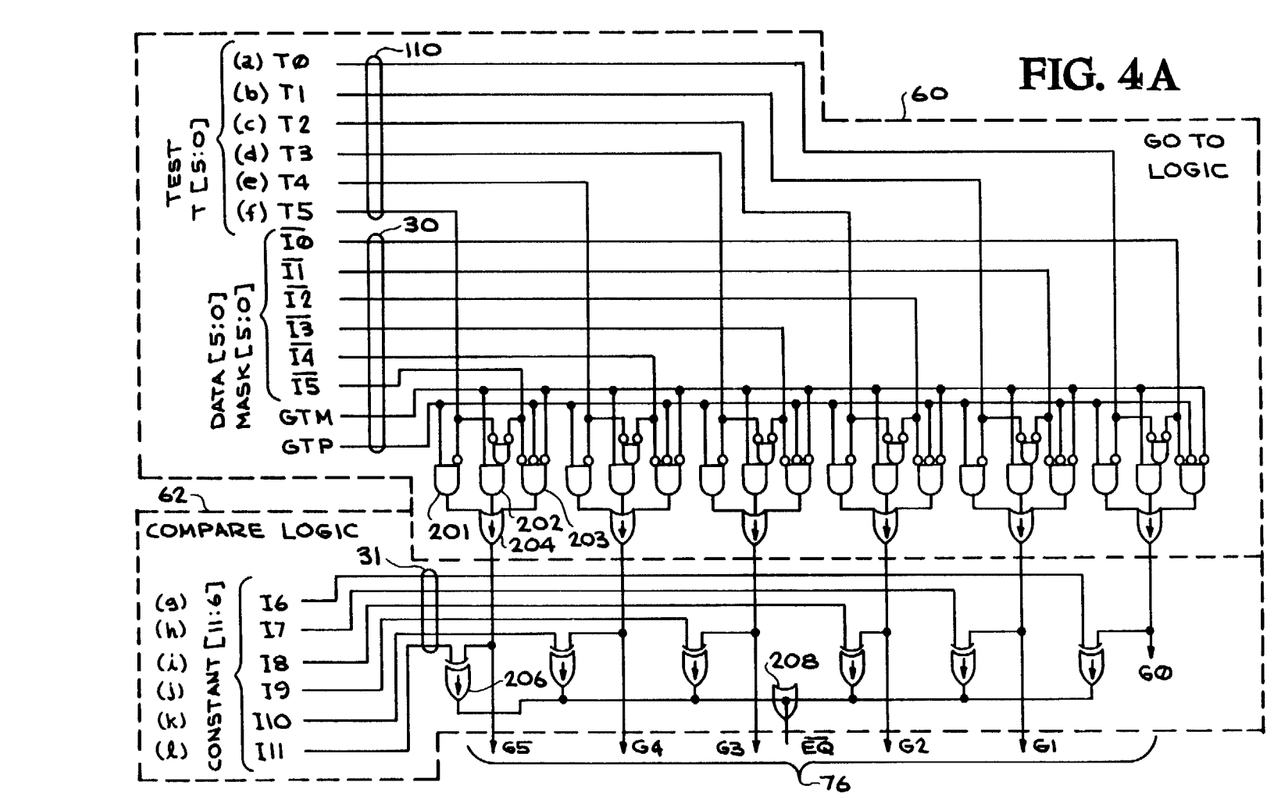
FIG. 4A is a circuit diagram of a GOTO logic circuit and a COMPARE logic circuit.

Referring to FIG. 4A, a schematic logic circuit diagram of the GOTO logic circuit 60 is shown. The test/data bus 110 is shown having the test signals T[5:0] on respective lines thereof. The data/mask bus 30 is shown having DATA[5:0] or MASK(5:0) subfields thereon. Bus 31 has the subfield CONSTANT [11:6] thereon. The branch control logic for a representative bit line is a number of groups AND gates typically represented as 200, 201, 202 having normal and inverted inputs and having outputs fed to the inputs of a typical OR gate 204. The OR gate 204 output G5 is one of the bits which the GOTO logic 60 provides on bus 76. The inputs to the AND gates 200, 201, 202 are the TEST[5:0] inputs and the DATA[5:0]/MASK(5:0) inputs which are selected by the GTM and GTP inputs from the microinstruction decoder 16.

Figure 4B:
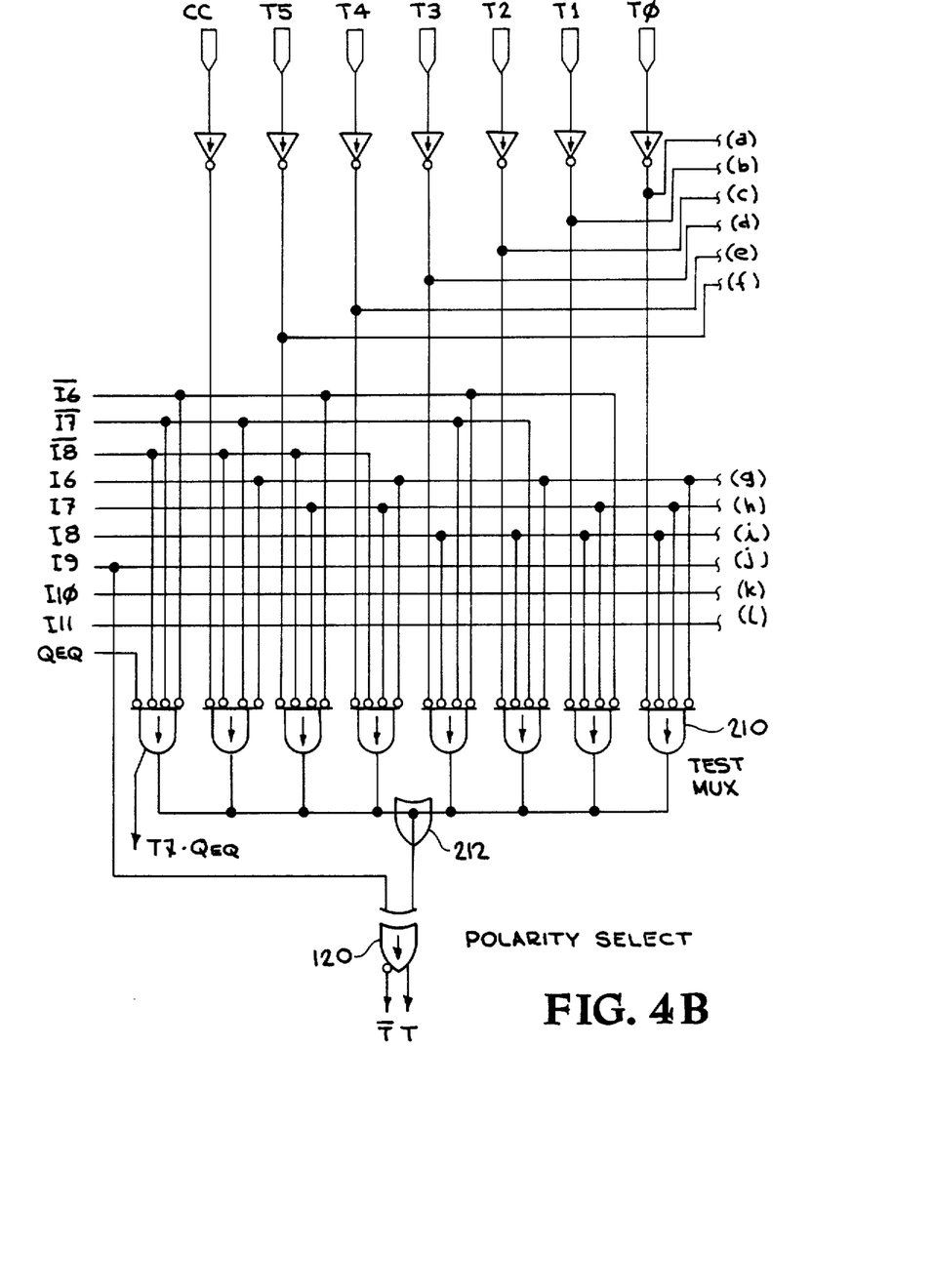
FIG. 4B is a logic circuit diagram of a test condition code selection logic circuit.

The logic circuit for the COMPARE LOGIC 62 is typically shown in FIG. 4B for a representative bit line as an EXCLUSIVE-OR gate 206 having the GOTO logic output G5 at one input terminal and one bit of the CONSTANT [11:6] input and a second input terminal. The various outputs of the other EXCLUSIVE-OR gates are inputted to the OR-gate 208 which provides an inverted EQ output.

Two types of outputs from the GOTO logic 60 are possible. In one, the DATA[5:0] subfield passes directly through. Branching and loading from the DATA[5:0] subfield is an immediate operation which stays internal to the integrated circuit. In the other type of output from the GOTO logic 60, the T[5:0] input is under bitwise mask from the MASK[5:0] input to give a T*M function. Branching and loading using the T*M mode of operation allows off-chip, that is, external, microaddress and count values to be used, while also providing for multiway branching capabilities. For example, a one-of-eight multiway branch is generated by setting MASK[5:3] to zero, which masks off the upper three T inputs, and by setting MASK[2:0] to all ones. This passes the lower three T inputs. A branch to one of the first eight microprogram locations occurs depending upon the condition of the lower T inputs. For example, if all three lower T inputs are zero, a branch to memory 12 location zero occurs.

The GOTO logic 60 also has a special six-bit wide comparison logic function using MINST[11:6] (CONSTANT) as an additional input from microcode and also has an equal-to (EQ) output that is inputted to a D-type rising-edge triggered flip-flop which sets an EQ flag output coupled to the condition code selection logic if T*M is equal to the CONSTANT value and is unaffected if no equality occurs. This allows multiple tests of any group of T inputs to be obtained in a manner analagous to a sum-of-products function where the EQ flag is set if any of the tests are true. The EQ flag is reset when any type of conditional branch occurs or when the RESET input is low.

CONDITION CODE SELECTION LOGIC

The condition code selection logic 18 includes an eight-to-one multiplexer having an output coupled to one input of an exclusive-or gate 120 having true and complement outputs coupled to the microinstruction decode circuit 16. Eight input bits are fed to the condition code selection logic 18, these include the EQ flag, the condition code input CC, and the six test input bits T[5:0]. Selection of which one of the eight conditions is to be tested, is by TEST[2:0] where:

| TEST [2:0] | BIT UNDER TEST |
|---|---|
| 000 | T[0] |
| 001 | T[1] |
| 010 | T[2] |
| 011 | T[3] |
| 100 | T[4] |
| 101 | T[5] |
| 110 | CC |
| 111 | EQ |

Selection of the test polarity of the condition code selection logic 18 is obtained with an exclusive-or gate 120 is controlled by POL [9] which is used as the other input to the exclusive-or gate 120. When POL [9], which is high, the false version of the selected test condition is an input to the microinstruction decode circuit 16. When POL [9] is low, the true version of the selected test condition is an input to the microinstruction decode circuit 16.

Referring to FIG. 4B, a schematic logic circuit for the test condition code select logic 18 is shown. The circuit includes eight inverted-input AND gates, typically represented as 210, each of which has one of the inverted external test inputs T[5:0], the inverted condition code cc, or the QEQ bits connected to an input thereof. Inverted and non-inverted versions of the TEST[8:6] bits (I6, I7, I8) are connected to the other inputs of the AND gates, typically represented as 210. The outputs of the AND gates are fed to the inputs of an OR gate 212 which has its output coupled to one input of a polarity-select EXCLUSIVE-OR gate 214. The other input of gate 120 is connected to I9, the POL[9] input. The inverted and non-inverted outputs of gate 120 are inputted to the microinstruction decoder 16 as the selected test condition bit. Note that the T[5:0] inputs to the Test Conditions Code Select Logic 18, represented in FIG. 4B, and the GOTO logic 60, represented in FIG. 4A, share some terminals as indicated by (a)–(f). This sharing saves, in this example, six input pins.

MICROINSTRUCTION DECODE

Referring to FIG. 3B, the microinstruction decode logic 16 is a programmed logic array which provides the control signals GTP, GTM, CSG, CSD, CSS, SSC, SSI, PSG, PSS, PSP appropriately control the functioning of the multiplexers 50,80,90 and the GOTO logic 60 of the microaddress control logic circuit 14 for each of its twenty-nine different microinstructions. The various inputs to the microinstruction decode logic circuit 16 include the OPCODE [14:10], the zero detection circuit 98 output for the loop counter 94, and the selected test condition code from the conditional code selection logic 18. The respective outputs of the microinstruction decode logic circuit control the PCMUX (PSG, PSS, PSP), the stack register SMUX 80 (SSC, SSI) stack register, the loop counter CMUX 90 (CSG, CSD, CSS), and the GOTO logic 60 (GTP, GTM).

MICROINSTRUCTION SET DEFINITIONS

The instruction set forth below permits implementation of a microinstruction set to obtain conditional branching, conditional subroutine calling, conditional returns, conditional loop counting, multiway branching, timing and waveform generation, conditional holding, field comparison, conditional load counting, and conditional pushing.

| OPCODE/MNEMONIC | DESCRIPTION |
|---|---|
| 0 - RETURN:LOAD PL | Conditional return from subroutine and load the COUNTER from the PL (DATA[5:0]). The SREG provides the return from subroutine address. |
| 1 - RETURN NESTED: LOAD PL | Conditional return from nested subroutine and load the COUNTER from the PL (DATA[5:0]). This microinstruction treats the SREG and COUNTER as a two-deep stack providing the SREG value as a return address and the COUNTER value as a nested return address that is transferred into the SREG. |
| 2 - RETURN | Conditional return from subroutine. The SREG provides the return from subroutine address. |
| 3 - RETURN NESTED | Conditional return from nested subroutine. This microinstruction treats the SREG and COUNTER as a two-deep stack providing the SREG value as a return address and the COUNTER value as a nested return address that is transferred into the SREG. |
| 4 - LOAD PL | Conditional load the COUNTER from the PL |

-continued

| OPCODE/MNEMONIC | DESCRIPTION |
| --- | --- |
| | (DATA[5:0]). |
| 5 - LOAD PL NESTED | Conditional load the COUNTER from the PL (DATA[5:0]) nested. The COUNTER and SREG are treated as a two-deep nested counter, the previous COUNTER value is pushed into the SREG as a nested count, and the COUNTER is loaded from PL. |
| 6 - LOAD T*M | Conditional load the COUNTER from the T*M (T[5:0] inputs under bitwise mask from DATA[5:0]). |
| 7 - LOAD T*M NESTED | Conditional load the COUNTER from the T*M (T[5:0] inputs under bitwise mask from DATA[5:0]) nested. The SREG and COUNTER are treated as a two-deep nested counter, the previous COUNTER value is transformed into the SREG and the COUNTER is loaded from T*M. |
| 8 - LOOP PL | Conditional loop to the address in the PL (DATA[5:0]). This microinstruction is intended to be place at the bottom of an iterative loop. If the COUNTER is not equal to zero, the COUNTER is decremented (signifying completion of an iteration), and a branch to the top of the loop at PL is executed. If the COUNTER is equal to zero, looping is complete and the next sequential microinstruction is executed. |
| 9 - DECREMENT | Conditional decrement of the COUNTER. |
| 10 - LOOP PL NESTED | Conditional loop to the address in the PL (DATA[5:0]) nested. The SREG and COUNTER are treated as a two-deep nested counter, and the microinstruction is intended to be place at the bottom of an "inner-nested" iterative loop. If the COUNTER is not equal to zero, the COUNTER is decremented (signifying completion of an iteration), and a branch to the top of the loop at PL is executed. If the COUNTER is equal to zero, the inner loop is complete, and the count value for the outer loop is transferred from the SREG into the COUNTER. |
| 11 - GOTOZ | Conditional branch, when the COUNTER is equal to zero, to the address in the PL (DATA[5:0]). |
| 12 - COUNT/LOAD PL | Conditional Hold until the counter is equal to zero, then load COUNTER from the PL (DATA[5:0]). This microinstruction is intended for timing waveform generation. If the COUNTER is not equal to zero, the same microinstruction is re-fetched while the COUNTER is decremented. Timing is complete when the COUNTER is equal to zero, causing the next microinstruction to be fetched and the COUNTER to be reloaded from PL. |
| 13 - CONTINUE | The next sequential microinstruction is fetched unconditionally. |
| 14 - COUNT/LOAD T*M | Conditional Hold until the counter is equal to zero, then load COUNTER from the T*M (T[5:0] under bitwise mask from DATA[5:0]). This microinstruction is intended for timing waveform generation. It the COUNTER is not equal to zero, the same microinstruction is re-fetched while the COUNTER is decremented. Timing is complete when the COUNTER is equal to zero, causing the next microinstruction to be fetched and the COUNTER to be reloaded from T*M. |
| 15 - GOTO T*M | Conditional branch to the address defined by the T*M (T[5:0] under bitwise mask from DATA[5:0]). This microinstruction is intended for multiway branches. |
| 20 - PUSH:LOAD PL | Conditional push the PC+1 into the SREG and load the COUNTER from the PL (DATA[5:0]). |
| 21 - PUSH | Conditional push the PC+1 into the SREG. |
| 22 - PUSH:LOAD T*M | Conditional push the PC+1 into the SREG and load the COUNTER from the T*M (T[5:0] under bitwise mask from DATA[5:0]). |
| 23 - PUSH NESTED | Conditional push the PC+1 into the SREG |

| OPCODE/MNEMONIC | DESCRIPTION |
|---|---|
| | nested. This microinstruction treats the SREG and COUNTER as a two-deep stack, PC+1 is pushed into SREG and the previous value in SREG is transferred into the COUNTER. |
| 24 - FORK | Conditional branch to the address in the PL (DATA[5:0]) or the SREG. A branch to PL is taken if the condition is true and a branch to SREG if false. |
| 25 - GOTO PL | Conditional branch to the address in the PL (DATA[5:0]). |
| 26 - HOLD PL | Conditional Hold. The current microinstruction will be re-fetched and executed until the condition under test becomes true. When true, a branch to the address in the PL (DATA[5:0]) is executed. |
| 27 - COUNT:HOLD PL | Conditional Hold/Count. The current microinstruction will be re-fetched and the COUNTER decremented until the condition under test becomes true of the counter is equal to zero. If the condition becomes true, a branch to the address in the PL (DATA[5:0]) is executed. If the counter becomes zero without the condition becoming true, a CONTINUE is executed. |
| 28 - CALL PL | Conditional jump to subroutine at the address in the PL (DATA[5:0]). The PC+1 is pushed into the SREG as the return address. |
| 29 - CALL PL NESTED | Conditional jump to subroutine at the address in the PL (DATA[5:0]) nested. The SREG and COUNTER are treated as a two-deep stack, the PC+1 is pushed into the SREG as the return address and the previous SREG value is transferred into the COUNTER as a nested return address. |
| 30 - CALL T*M | Conditional jump to subroutine at the address specified by the T*M (T[5:0] under bitwise mask from DATA[5:0]). The PC+1 is pushed into the SREG as the return address. |
| 31 - CALL T*M NESTED | Conditional jump to subroutine at the address specified by the T*M (T[5:0] under bitwise mask from DATA[5:0]) nested. The PC+1 is pushed into the SREG as the return address and the previous SREG value is transferred into the COUNTER as a nested return address. |
| 100(binary) - COMPARE | Compare. This microinstruction performs a bitwise exclusive-or of T*M (T[5:0] under bitwise mask from DATA[5:0]) with CONSTANT (MINST 11:6). If T*M equals CONSTANT, the EQ flag is set to one which may be branched on in a following microinstruction. If no equal, the EQ flag is unaffected. This allows sequences of compares, in a manner analogous to sum-of-products, to be preformed which can be followed by a single conditional branch if one or more of the comparisons were true. Note: the EQ flag is set to zero on reset and when EQ is selected as the condition in a branch. |

SINGLE CHIP CONCEPT

Figure 5:
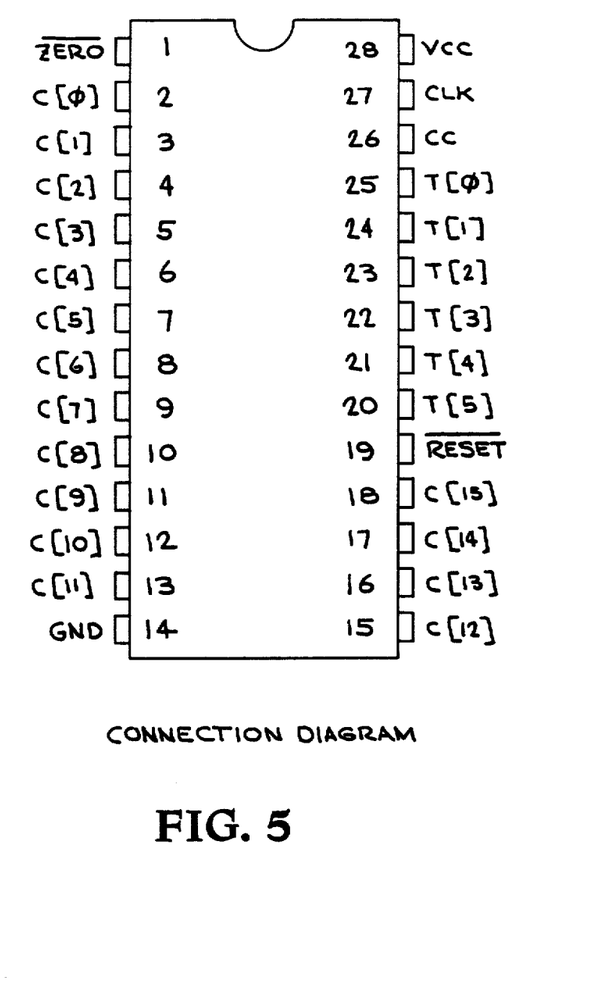
FIG. 5 is a pin-connection diagram for a single-chip integrated circuit controller according to the invention.

FIG. 5 shows a pin connection diagram for a 28 pin single-chip integrated circuit according to the invention. The T[5:0] pins are shared pins for test data and external address data.

| | |
|---|---|
| CC | The condition code test input. When the TEST[2:0] field in the microinstruction being executed is set to 6 (binary 110), CC is selected as the test condition that controls conditional opertation. |
| CLK | The clock input is a rising-edge triggered common clock for the microprogram counter, counter, subroutine register, pipeline register, and EQ flag. |
| C[15:8] | The upper eight general purpose microprogram control outputs. These eight control outputs are synchronously enabled by the SOE[31] signal from the MSB of the microprogram pipeline register. When SOE[31] is HIGH, C[15:8] are enable and when LOW the outputs are tri-stated. |
| C[7:0] | The lower eight general purpose microprogram control outputs. These eight control outputs are permanently enabled. |
| RESET | The reset input. When /RESET is LOW, the uppermost |

| | -continued |
|---|---|
| | microprogram address of 63 is generated causing the microprogram counter to be set to 63 and the microinstruction at 63 to be loaded into the pipeline register following the next clock pulse. The EQ flag is also cleared on the same clock pulse. |
| T[5:0] | The six test inputs. In conditional microinstructions the T[5:0] inputs can be used as individual condition codes under selection of the TEST[2:0] field in the pipeline register. The T[5:0] inputs can also be used as a microbranch address when performing a microprogram branch, and a count value when loading the counter. |
| ZERO | The zero output. The /ZERO output, when LOW, indicates the counter value is zero. |

FUSE PROGRAMMING

The microprogram memory 12 of this preferred embodiment is programmed and verified with techniques like those used for programmable logic arrays. An embodiment of the invention is contained in the Am29PL141 provided by Advanced Micro Devices, Inc. of Sunnyvale, Calif. The memory array of the microprogram memory 12 is organized as a sixty-four word by 32-bit PROM. Individual fuses for a bit cell to be programmed are selected by successively selecting one of sixty-four word addresses, one of four bytes at that address, and one of eight bits in that particular byte. Control of programming and verification is attained by application of the sequence of voltages, in this case, on the control pins 9 and 10 of FIG. 5. An address to be programmed is selected using the T[5:0] inputs, pins 2-7. The byte addressing is done using C[7] and C[6]. The bit selection is done using a 20 volt programming voltage applied to each of the output pins, one at a time. Programming is initiated by raising pin 10 to about 20 volts, which places the device in the program mode and disables the output pins. The next step is to address the particular fuse to be programmed as stated previously. Raising pin 9 to about 20 volts initiates programming and removing the programming voltage from each of the bit outputs terminates programming.

The foregoing description of preferred embodiments of the invention have been presented for purposes of illustration and description. It is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto and their equivalents.

What is claimed is:

1. A programmable sequence controller having an instruction set, each instruction of which has a user-definable control portion, said controller fabricated as a single integrated circuit having a plurality of terminals receiving a plurality of external signals applied at predetermined ones of said terminals, including a clock signal, said controller in response thereto sequencing through user-definable internal states, and generating in response thereto a plurality of control signals, conducted to predetermined ones of said terminals, said control signals bearing a user-defined relationship to said externally applied signals and said states, said controller comprising:

addressable storage means for storing a plurality of said instructions;

address sequencing and control means responsive to said plurality of external signals, said clock signal, and to a plurality of internal signals for generating addressable storage means address signals and a plurality of test result signals;

an instruction register receiving one of said instructions from said addressable storage means specified by said address signals and generating therefrom at least a first plurality of said internal signals, and said control signals; and decoder means connected to said instruction register and responsive to said first plurality of said internal signals generated therefrom and connected to said address sequencing and control means and responsive to a first of said test result signals for generating therefrom predetermined ones of said plurality of internal signals received by said address sequencing and control means.

2. A programmable sequence controller according to claim 1 wherein said instruction register generates a second and a third plurality of said internal signals, and wherein said decoder means is further responsive to a condition signal, said controller further including condition code select means responsive to said plurality of external signals, including a condition code signal, connected to said instruction register, and responsive to said second and said third plurality of said internal signals generated therefrom and connected to said address sequencing and control means and responsive to a second of said test result signals for generating therefrom said condition signal conducted to said decoder means.

3. A programmable sequence controller according to claim 2 wherein said instruction set includes a compare instruction, and wherein said instruction register generates a fourth plurality of said internal signals conducted to said address sequencing and control means and said address sequencing and control means includes GOTO logic means for bitwise masking of predetermined ones of said external signals ("test") with said fourth plurality of internal signals ("mask") and for generating therefrom a user-selectable address signal for said addressable storage means, upon reception in said instruction register of said compare instruction, wherein said first plurality of internal signals is also conducted to said address sequencing and control means and said address sequencing and control means further includes comparison means receiving said first plurality of internal signals and said user-selectable storage means address signals generated by said GOTO logic means, for comparing said first plurality of internal signals ("constant") with said user-selectable address signals and for generating a signal ("EQ") if said comparison indicates equality, upon reception in said instruction register of said compare instruction, and wherein said plurality of external signals comprises a first, second, third, fourth, fifth and sixth signal, and said third plurality of internal signals comprises a three-bit portion, said condition code select means further receives said EQ signal generated by said comparison means, and comprises a test multiplexer generating said condition signal in accordance with the table:

| third plurality of internal signals | condition signal generated |
|---|---|
| 000 | first of said plurality of external signals |
| 001 | second of said plurality of external signals |
| 010 | third of said plurality of external signals |
| 011 | fourth of said plurality of external signals |
| 100 | fifth of said plurality of external signals |
| 101 | sixth of said plurality of external signals |
| 110 | said condition code signal |
| 111 | said EQ signal |

4. A programmable sequence controller according to claim 1 wherein said instruction set includes a compare instruction, and wherein said instruction register generates a second plurality of said internal signals conducted to said address sequencing and control means and said address sequencing and control means includes GOTO logic means for bitwise masking of predetermined ones of said external signals ("test") with said second plurality of internal signals ("mask") and for generating therefrom a user-selectable address for said addressable storage means, upon reception in said instruction register of said compare instruction.

5. A programmable sequence controller according to claim 4 wherein said first plurality of internal signals is also conducted to said address sequencing and control means and said address sequencing and control means further includes comparison means receiving said first plurality of internal signals and said user-selectable storage means address signals generated by said GOTO logic means, for comparing said first plurality of internal signals ("constant") with said user-selectable address signals and for generating a signal ("EQ") if said comparison indicates equality, upon reception in said instruction register of said compare instruction.

6. A programmable sequence controller according to claim 4 wherein said address sequencing and control means further includes:
an address counter receiving said clock signal and generating address sequence signals therefrom;
a post-incrementer receiving said address sequence signals and generating therefrom post-incremented address count signals;
counter/stack means receiving said post-incremented address count signals for storing "subroutine return" address signals;
loop incrementing/decrementing counter means receiving said user-selectable storage means address ("initial count") signal generated by said GOTO logic means for generating count value signals therefrom; and
a program control multiplexer receiving said address sequence signals, said post-incremented address count signals, said subroutine return address signals and said count value signals and selectably generating therefrom control address signals;
wherein said address sequence signals and said control address signals are said storage means address signals.

7. A programmable sesquence controller according to claim 6 wherein
said counter/stack means and said loop incrementing/decrementing counter means are interconnected,
said counter/stack means comprises a subroutine register for receiving and storing address signals and generating said subroutine return address signals, and a stack multiplexer receiving said post-incremented address count signals, said subroutine return address signals and said count value signals generated by said loop incrementing/decrementing means and selectably generating therefrom said address signals conducted to said subroutine register, and
said loop incrementing/decrementing means comprises a count register generating said count value signals, a decrementer receiving said count value signals and generating decremented count value signals therefrom, and a loop count multiplexer receiving an initial count signal, being a predetermined one of said user-selectable address signals, said decremented count value signals, said subroutine return address signals generated by said counter/stack means, and said count value signals and selectably generating therefrom address signals conducted to said count register; p1 whereby said interconnected counter/stack means and loop incrementing/decrementing counter means can selectably be operated as a separate one-deep stack and a separate counter, respectively, as a two-deep stack, or as a two-deep nested counter.

8. In a programmable sequence controller fabricated as a single integrated circuit having a plurality of terminals receiving a plurality of external signals applied at predetermined ones of said terminals, including a clock and a condition code signal, said controller in response thereto sequencing through user-definable states, and generating a plurality of control signals conducted to predetermined ones of said terminals, said control signals bearing a user-defined relationship to said externally applied signals and said states, said controller comprising: addressable means for storing a plurality of microinstructions, user-selectable from a microinstruction set, specifying the operation of said controller; address sequencing and control means responsive to said plurality of external signals and to a plurality of internal signals for generating storage means address signals and a plurality of test result signals; a microinstruction register connected to said address sequencing and control means and connected to said storage means receiving an addressed one of said microinstructions and generating therefrom a first, a second and a third plurality of said internal signals conducted to said address control means and said control signals; decoder means connected to said microinstruction register receiving said second plurality of internal signals, connected to said address sequencing and control means receiving a first of said test result signals and responsive to a condition signal for generating therefrom predetermined ones of said internal signals conducted to said address control means; and condition code select means connected to said microinstruction register receiving said third plurality of internal signals, connected to said address sequencing and control means and responsive to said external signals for generating therefrom a condition signal conducted to said decoder means; wherein said condition code select means receives a second of said test result signals; wherein each microinstruction of said microinstruction set has an internal field and an external field, said set including a test and mask microinstruction in which said internal field comprises a mask portion and a constant portion and said address sequencing and control means response thereto is selectively operative in a compare mode; said address sequencing and control means including branch control means, responsive to said external and internal signals received by said address sequencing and control means and said second test result signal enabled in said compare mode for generating a predetermined level of said second test result signal when a predetermined correspondence is determined to exist between said constant portion of said microinstruction, said mask portion and said external signals.

9. A programmable controller according to claim 8 wherein said address sequencing and control means further includes loop counter means for generating signals representative of said "state", a program counter and program counter (PC) multiplexer means connected to said loop counter means and said program counter responsive to predetermined ones of said internal signals generated by said decoder means for generating at an output said storage means address signals, wherein said branch control means includes comparison means receiving said second plurality of internal signals and includes GOTO logic means receiving said external signals and signals representing during said compare mode said mask portion and generating therefrom bitwise masking signals and further receives signals representing during said compare mode said constant portion and said bitwise masking signals generating therefrom said second test result signal.

10. A method of operating a single integrated circuit programmable sequence controller receiving a plurality of external signals operative by executing microinstructions from a set, including a conditional branch microinstruction and a compare microinstruction, having at least a field comprising a mask and a constant portion and sequencing through user-definable states and generating a plurality of control signals bearing a user-definable relationship to said external signals and said states, said sequence controller comprising: addressable storage means for storing said microinstructions; address sequencing and control means for generating storage addresses and a plurality of flag signals; microinstruction register receiving microinstructions to be executed; microinstruction decoder means for effecting execution of microinstructions received in said register; said address control means including bitwise masking and comparison means; said method comprising the steps:

(a) applying user-selected ones of said external signals;
(b) executing a compare microinstruction having user-selected mask and constant portions;
(c) performing bitwise masking of said external signals with said mask portion;
(d) comparing the result of step (c) with said constant portion;
(e) setting a predetermined one of said flag signals to a first predetermined level if the comparison in step (d) indicated equality and to a second predetermined level otherwise;
(f) repeating steps (a) through (e) a selectable number of times, including zero times; and
(g) executing a conditional branch microinstruction which effects a branch operation based on the level of said flag set at step (e).

* * * * *